(12) United States Patent
Jung

(10) Patent No.: US 7,052,024 B2
(45) Date of Patent: May 30, 2006

(54) SUSPENSION ASSEMBLY APPLICABLE TO BOTH MANUAL AND POWER STEERING SYSTEMS

(75) Inventor: Dall-Hee Jung, Kyunggi-do (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 159 days.

(21) Appl. No.: 10/720,228

(22) Filed: Nov. 25, 2003

(65) Prior Publication Data
US 2005/0051989 A1    Mar. 10, 2005

(30) Foreign Application Priority Data
Sep. 6, 2003  (KR) ............... 10-2003-0062335

(51) Int. Cl.
*B62D 17/00*  (2006.01)

(52) U.S. Cl. ............ 280/86.756; 280/124.145; 280/86.751; 280/86.754; 280/93.512; 280/93.511

(58) Field of Classification Search ............ 280/86.75, 280/86.756, 86.751, 124.125, 124.134, 124.145, 280/124.146, 124.154, 93.511, 93.512
See application file for complete search history.

(56) References Cited

U.S. PATENT DOCUMENTS

| | | | | |
|---|---|---|---|---|
| 5,120,150 A * | 6/1992 | Kozyra et al. | ................. | 403/24 |
| 5,169,171 A * | 12/1992 | Ban et al. | .............. | 280/86.753 |
| 5,915,727 A * | 6/1999 | Bonnville | .................... | 280/788 |
| 6,116,627 A * | 9/2000 | Kawabe et al. | ......... | 280/124.15 |
| 6,293,724 B1* | 9/2001 | Spears et al. | ................ | 403/122 |
| 6,367,830 B1* | 4/2002 | Annequin et al. | ...... | 280/93.512 |
| 6,431,565 B1* | 8/2002 | McIntyre | ............... | 280/86.751 |
| 6,457,728 B1* | 10/2002 | Klais | ........................ | 280/86.75 |
| 6,485,223 B1* | 11/2002 | Van Schmus et al. | ... | 403/408.1 |
| 6,739,788 B1* | 5/2004 | Hagemes et al. | ........... | 403/122 |

FOREIGN PATENT DOCUMENTS

KR    1996-0031165    9/1996

* cited by examiner

Primary Examiner—Paul N. Dickson
(74) Attorney, Agent, or Firm—Greenblum & Bernstein, P.L.C.

(57) ABSTRACT

A vehicular suspension assembly is applicable to both manual and power steering systems. In the suspension assembly, when the manual steering system and the power steering system are exchanged with each other, a strut, a lower arm and a frame are commonly used. Three mounting bolts of an insulator are eccentrically disposed relative to the center of the strut. A connector has an insertion hole which is eccentrically drilled on a connector. A bracket of the frame is shared by two applications. Thus, it is possible to perform all functions of both manual and power steering systems.

12 Claims, 5 Drawing Sheets

[FIG. 1] PRIOR ART
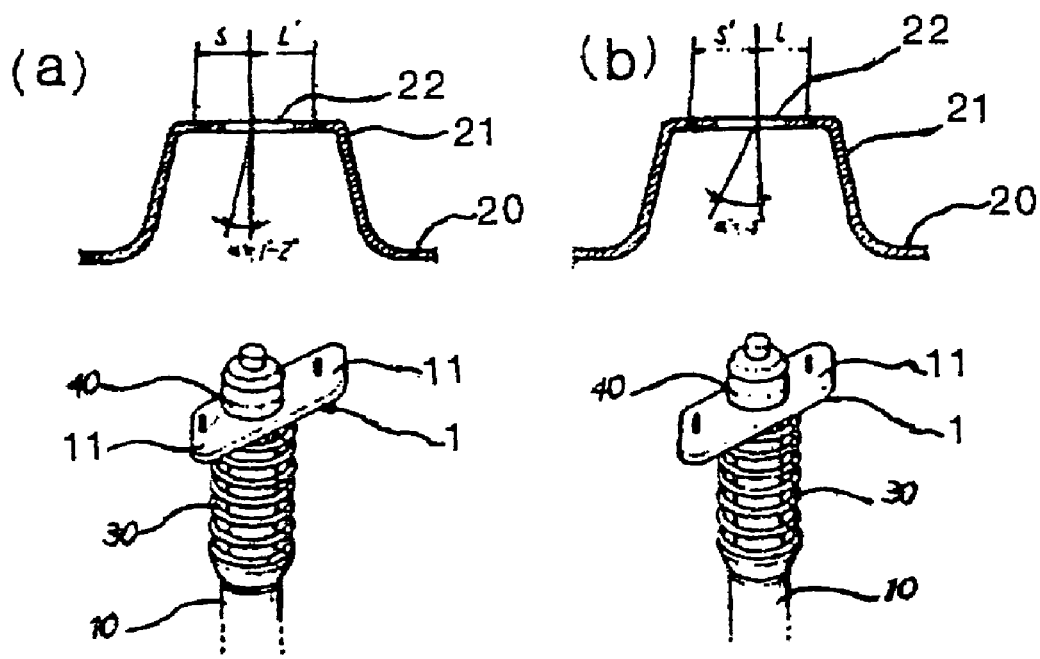

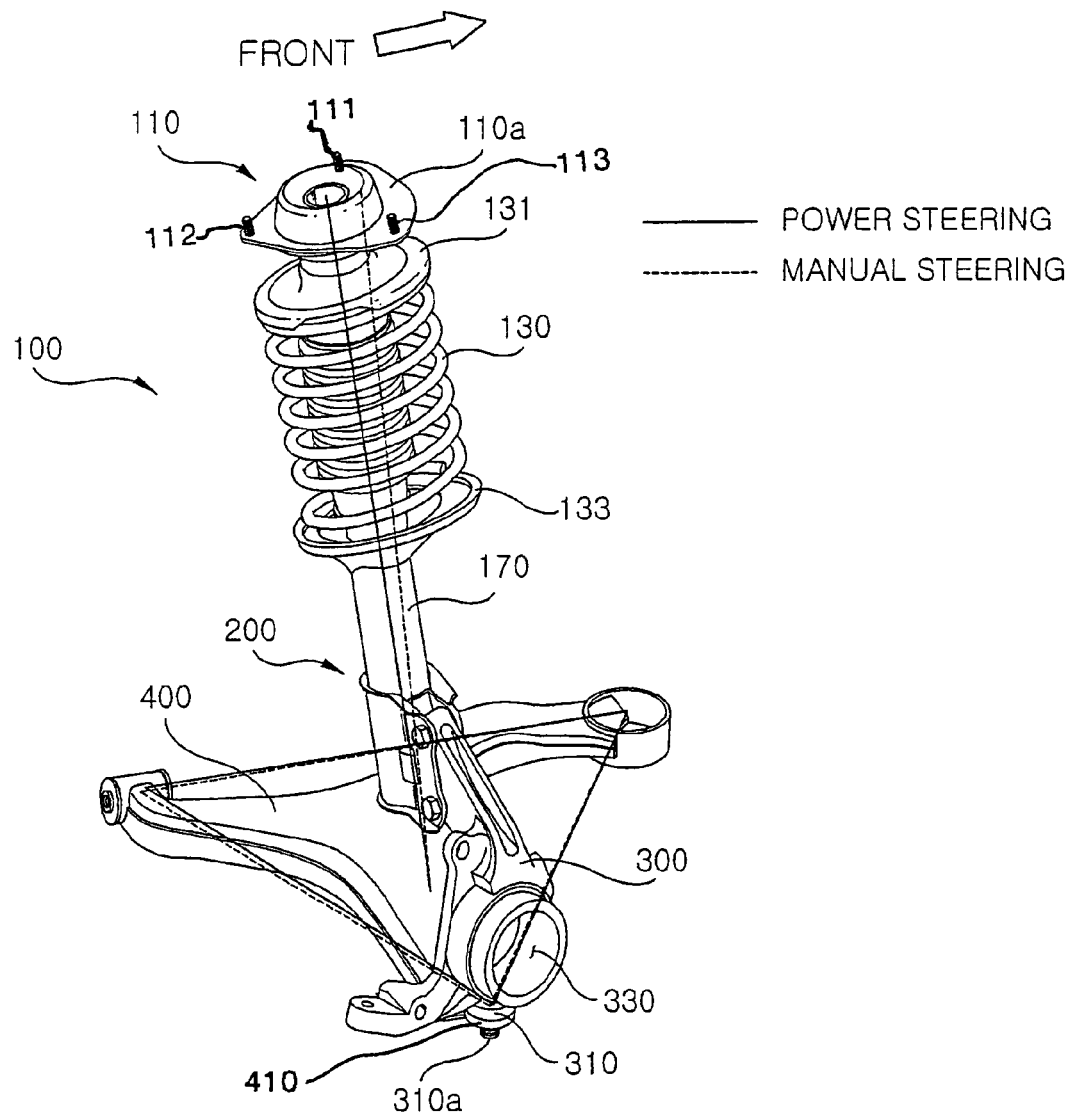
[FIG. 2]

[FIG. 3]
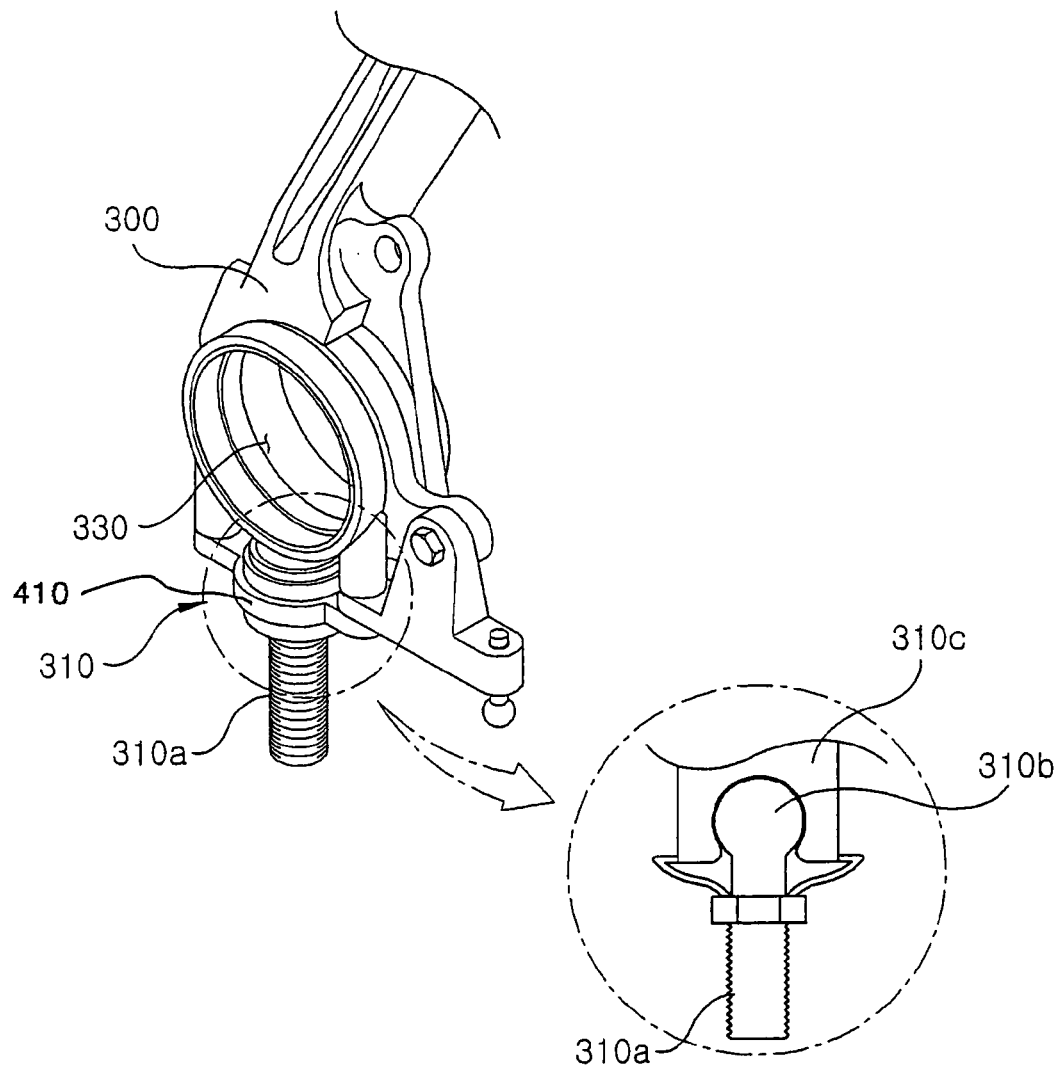

[FIG. 4]
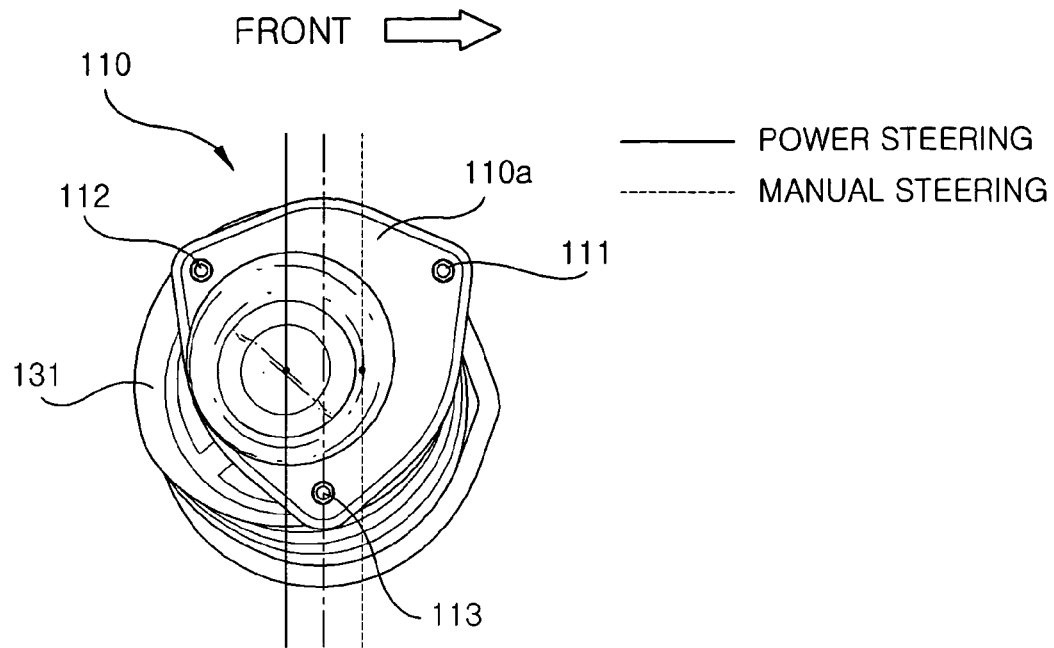
[FIG. 5]
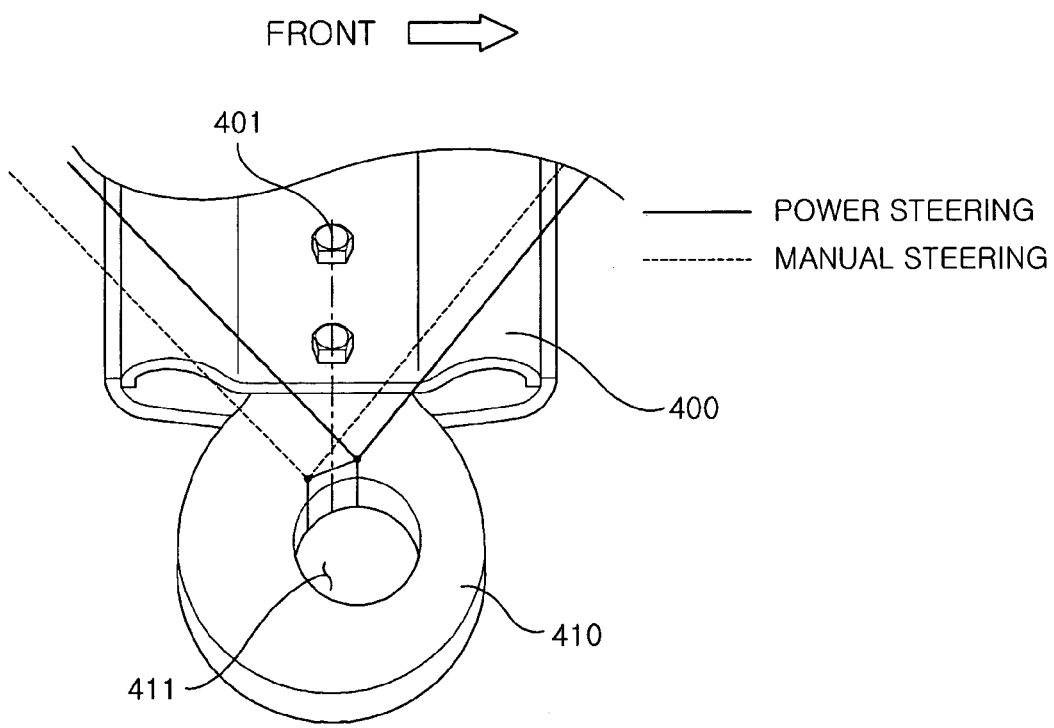

[FIG. 6]
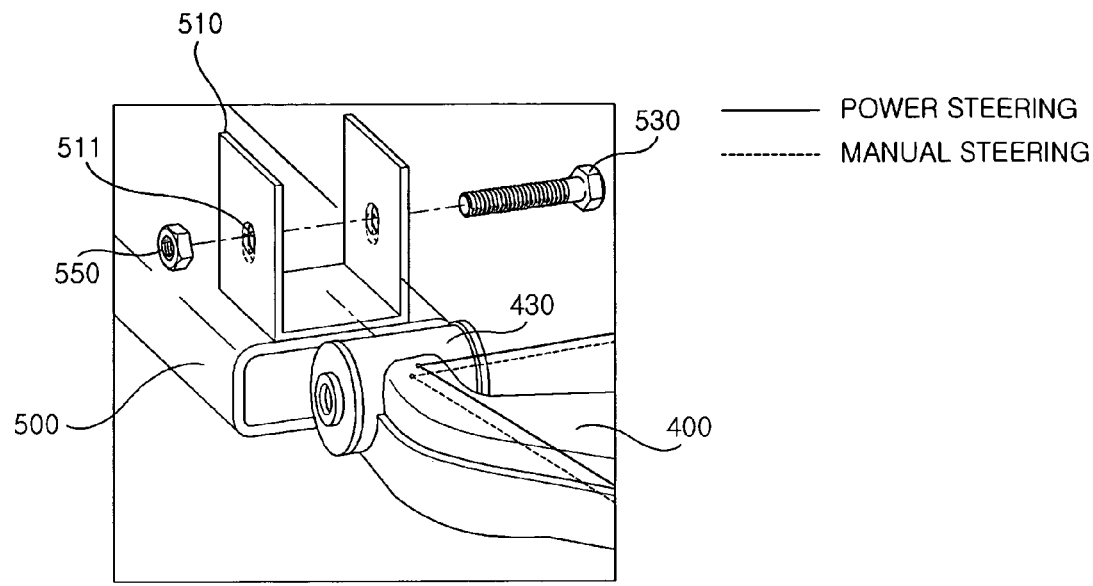
[FIG. 7]
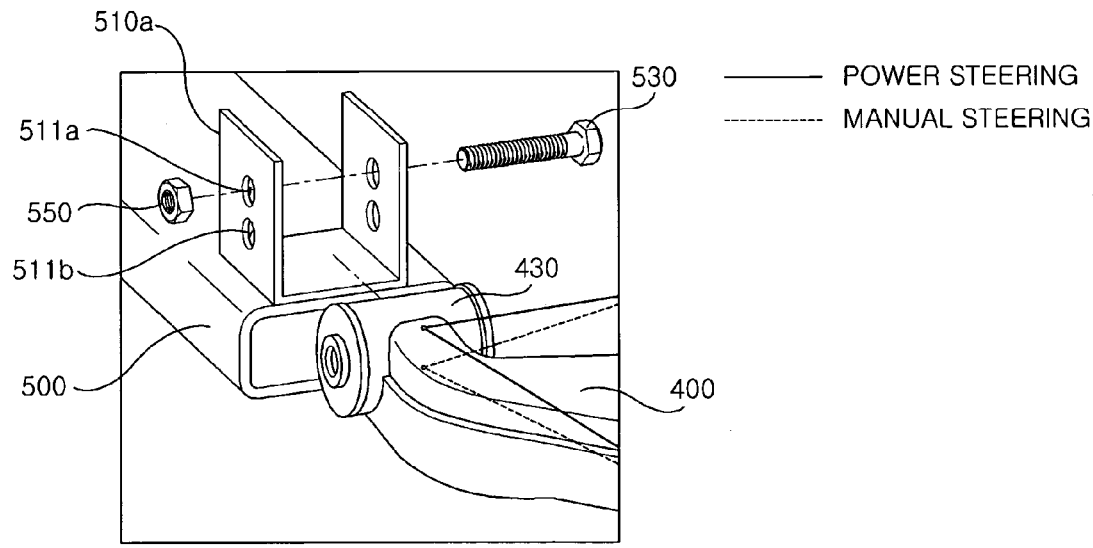

SUSPENSION ASSEMBLY APPLICABLE TO BOTH MANUAL AND POWER STEERING SYSTEMS

The present disclosure relates to subject matter contained in priority Korean Application No. 10-2003-0062335, filed on Sep. 6, 2003, which is herein expressly incorporated by reference in its entirety.

BACKGROUND OF THE INVENTION

1. Field of the Invention

The present invention relates to a vehicular suspension assembly, and more particularly to a suspension assembly applicable to both manual and power steering systems, in which, when the manual steering system and the power steering system are exchanged with each other, a strut, a lower arm and a frame are used in common, and three mounting bolts of an insulator are eccentrically disposed, and an insertion hole of a connector of the lower arm is eccentrically drilled, and a bracket of the frame is shared by two applications, thereby allowing all functions of both manual and power steering systems to be performed.

2. Background of the Related Art

Generally, a suspension is an apparatus for connecting an axle and a body to prevent vibration or shock applied from a road surface during a traveling motion from being directly transmitted to the body, thus preventing damage of the body or baggage loaded in a vehicle as well as enhancing a comfortable sense of an occupant.

In the meantime, caster, a wheel alignment factor, means that a steering axle slopes to the front or rear of the vehicle. A negative caster refers to tilting forward, while a positive caster refers to tilting rearward. In particular, the positive caster helps directional stability. A vehicle mounting a power steering system has more positive caster than that mounting a manual steering system. The positive caster is available to overcome the effect of power steering which tends to maintain front wheels straight while a vehicle travels along a curved road. An additional increase of the positive caster requires a strong force for steering, which a vehicular driver fails to feel due to auxiliary power.

Korean Patent Laid-open Publication No. 1996-0031165 discloses an example of a suspension capable of adjusting a caster angle for manual and power steering in the same kind of vehicles.

FIG. 1a is a sectional view illustrating an underbody and a perspective view illustrating a strut mount, in which the underbody is separated from the strut mount in a conventional manual steering system. FIG. 1b is a sectional view illustrating an underbody and a perspective view illustrating a strut mount, in which the underbody is separated from the strut mount in a conventional power steering system. As shown in FIGS. 1a and 1b (with reference numerals changed from Korean Patent Laid-open Publication No. 1996-0031165), in a vehicular suspension designed to adjust a caster angle in connection of a strut with an underbody, a strut mount 1 is mounted to a wheel housing 21 by a fastener 11. In this case, the fastener 11 has an asymmetrical length. A bearing of the strut is eccentrically provided in a bearing hole 22 of the wheel housing so as to be capable of adjusting a caster angle for manual and power steering.

However, the foregoing suspension capable of adjusting a caster angle for manual and power steering in the identical kind of vehicles has problems as follows.

The strut mount 1 is mounted to the wheel housing 21 by the fastener 11. With this construction, the caster angle for manual and power steering is adjusted. For this reason, a center point of the wheel connected to a steering knuckle is changed, and thus an interference with the body is incurred.

Further, a position of a tie rod joint is changed, and thus a distance of tow controlled by a tie rod is changed.

SUMMARY OF THE INVENTION

Therefore, the present invention has been made in view of the foregoing problems, and it is an object of the present invention to provide a suspension assembly applicable to both manual and power steering systems, capable of commonly using a strut and a lower arm in the manual and power steering systems without changing the position of the center point of a wheel shaft connected to a steering knuckle in the same kind of vehicles.

It is another object of the present invention to provide a suspension assembly applicable to both manual and power steering systems, capable of commonly using a lower arm and a connector to reduce unnecessary production costs caused by a separate connector as well as to save the unit price of production.

It is still another object of the present invention to provide a suspension assembly applicable to both manual and power steering systems, capable of commonly using an existing frame by means of substitution of only a bracket in the existing frame.

It is a further object of the present invention to provide a suspension assembly applicable to both manual and power steering systems, capable of commonly using a bracket and a frame to cover a changed geometry of a lower arm, thereby enhancing capabilities for producing and assembling.

It is a still further object of the present invention to provide a suspension assembly applicable to both manual and power steering systems, capable of commonly using components of the suspension in both manual and power steering systems to prevent overlapping investment, thereby allowing investment costs to be saved.

To achieve the above objects, according to the invention, there is provided a suspension assembly applicable to both manual and power steering systems, comprising: a strut having a coil spring and a shock absorber integrally coupled to the coil spring, for supporting a vehicle body; an insulator for mounting an upper end of the strut to the vehicle body; a steering knuckle connected to a lower end of the strut; a ball joint assembly formed at the steering knuckle; a connector having an insertion hole drilled therein for inserting a ball stud of the ball joint assembly thereto; and a lower arm mounted with the connector, wherein the insulator has at least three mounting bolts eccentrically disposed relative to the center of the strut, and wherein the connector is exchangeable with another connector having the insertion hole drilled at a different position.

According to this construction, it is possible to commonly use a strut and a lower arm in the manual and power steering systems without changing the position of the center point of a wheel shaft connected to a steering knuckle in the same kind of vehicles.

In the foregoing construction, the insertion hole of the connector is eccentrically drilled about a position where the connector is fastened. In these circumstances, it is possible to commonly use a lower arm and a connector, so that it is possible to reduce unnecessary production costs caused by a separate connector as well as to save the unit price of production.

Furthermore, the lower arm is mounted to a frame by means of the bracket, and wherein the bracket is shared by two applications with a fastening hole drilled therein to be fitted to a changed geometry of the lower arm. As a result, it is possible to commonly use an existing frame by means of substitution of only a bracket in the existing frame.

In the meantime, the lower arm is mounted to a frame by means of the bracket, and wherein the bracket has a plurality of fastening holes drilled therein to allow a changed geometry of the lower arm. Thus, it is possible to commonly use a bracket and a frame and to cover a changed geometry of a lower arm, so that capabilities for producing and assembling are enhanced.

BRIEF DESCRIPTION OF THE DRAWINGS

The above and other objects, features and other advantages of the present invention will be more clearly understood from the following detailed description taken in conjunction with the accompanying drawings, in which:

FIG. 1a is a sectional view illustrating an underbody and a perspective view illustrating a strut mount, in which the underbody is separated from the strut mount in a conventional manual steering system;

FIG. 1b is a sectional view illustrating an underbody and a perspective view illustrating a strut mount, in which the underbody is separated from the strut mount in a conventional power steering system;

FIG. 2 is a perspective view illustrating a suspension assembly applicable to both manual and power steering systems according to a preferred embodiment of the present invention;

FIG. 3 is a magnified perspective illustrating the steering knuckle and the ball joint assembly of FIG. 2;

FIG. 4 is a magnified plan view illustrating the insulator of FIG. 2;

FIG. 5 is a perspective view illustrating the lower arm and the connector of FIG. 2;

FIG. 6 is an exploded perspective view illustrating the mounting portion and the bracket of FIG. 2; and FIG. 7 is an exploded perspective view illustrating a variant of the mounting portion and the bracket of FIG. 2.

DETAILED DESCRIPTION OF THE PREFERRED EMBODIMENT

Reference will now be made in detail to the preferred embodiments of the present invention, examples of which are illustrated in the accompanying drawings. In the following description and drawings, the same reference numerals are used to designate the same or similar components, and so an explanation on the same or similar components will be omitted.

For the sake of reference, among the components of the present invention which will be described below, the same components as those of the prior art will not be separately described in detail, but will make reference to the foregoing.

FIG. 2 is a perspective view illustrating a suspension assembly applicable to both manual and power steering systems according to a preferred embodiment of the present invention, FIG. 3 is a magnified perspective illustrating the steering knuckle and the ball joint assembly of FIG. 2, FIG. 4 is a magnified plan view illustrating the insulator of FIG. 2, FIG. 5 is a perspective view illustrating the lower arm and the connector of FIG. 2, FIG. 6 is an exploded perspective view illustrating the mounting portion and the bracket of FIG. 2, and FIG. 7 is an exploded perspective view illustrating a variant of the mounting portion and the bracket of FIG. 2.

As shown in FIGS. 2 and 3, a suspension assembly applicable to both manual and power steering systems according to the present embodiment comprises a strut 100, an insulator 110, a steering knuckle 300, a ball joint assembly 310, a connector 410 and a lower arm 400.

The strut 100 has a coil spring 130 and a shock absorber 170 integrally coupled to the coil spring and functions to support a vehicle body. The insulator 110 serves to mount an upper end of the strut 100 to the body to absorb a shock. The steering knuckle 300 is connected to a lower end of the strut 100. The ball joint assembly 310 is provided at a lower end of the steering knuckle 300. The connector 410 has an insertion hole drilled therein, so that a ball stud of the ball joint assembly 310 can be inserted into the insertion hole. And, the lower arm 400 mounted with the connector 410.

The shock absorber 170 is provided inside the strut 100.

Similarly to the prior art, the insulator 110 is composed of an upper supporting plate 110a and a lower supporting plate (not shown). A buffering material (not shown) for shock absorption is provided between the upper and lower supporting plates.

Three mounting bolts 111, 112 and 113 are mounted to the upper supporting plate 110a.

The mounting bolts 111, 112 and 113, as shown in FIG. 2, are eccentrically disposed relative to the center of the strut 100.

An upper spring seat 131 is provided under the lower supporting plate of the insulator 110.

The upper spring seat 131 comes into contact with the coil spring 130, a lower end of which is provided with a lower spring seat 133 for supporting the coil spring 130.

The mounting bracket 200 is mounted to a lower end of the shock absorber 170 and coupled with the steering knuckle 300.

The steering knuckle 300 is provided with a wheel shaft joint 330, which is connected to a wheel shaft (not shown). The ball joint assembly 310 is mounted to a lower end of the steering knuckle 300.

In general, the ball joint assembly 310 is so constructed that a spherical ball 310b integrally formed with a ball stud 310a is pivotably mounted in a socket 310c.

The ball stud 310a is inserted into an insertion hole 411, which is drilled into the connector 410.

The connector 410 is mounted to one terminal end of the lower arm 400 by at least one bolt 401.

The connector is divided into one for manual steering and one for power steering. In the case of the manual steering system, the connector for manual steering, in which an insertion hole is drilled in the rearward direction of the body centering a position where the connector is fastened to the lower arm 400, is used. In the case of the power steering system, the connector for power steering, in which an insertion hole is drilled in the forward direction of the body centering a position where the connector is fastened to the lower arm 400, is used.

The other terminal end of the lower arm 400 is provided with a mounting portion 430.

The mounting portion 430 is mounted to a frame 500. To this end, the mounting portion 430 is inserted into a bracket 510, which is provided to the frame 500, and then fastened by a bolt 530, which has past through a fastening hole 511 of the bracket 510.

Hereinafter, an operation of the present embodiment having the foregoing construction will be described.

In the same kind of vehicles, when a manual steering system is exchanged with a power steering system, the frame 500, the lower arm 400 and the strut 100 are used in common.

More specifically, in the same kind of vehicles, in order to have a more positive caster value when a manual steering system is exchanged with a power steering system, first, the insulator 110 connecting the body and the upper end of the strut 100 is rotated at an angle of 120° in the counterclockwise direction.

The insulator 110 is mounted to the body by the mounting bolts 111, 112 and 113. When the insulator 110 is rotated at an angle of 120° in the counterclockwise direction, positions of the mounting bolts 111, 112 and 113 are each changed.

More specifically, the mounting bolt 112 is located at the position of the mounting bolt 111, the mounting bolt 113 is located at the position of the mounting bolt 112, and the mounting bolts 113 is located at the position of the mounting bolt 113.

Eventually, without a change in geometries of the mounting bolts 111, 112 and 113, a center position of the strut 100 connected to the insulator 110 is shifted in the rearward direction of the body, as shown in FIG. 4.

In this manner, when a center position of the strut 100 connected to the insulator 110 is shifted in the rearward direction of the body, a center position of the ball 310b of the ball joint assembly 310 mounted on the lower end of the steering knuckle 300 is forced to move in the forward direction of the body so as not to displace the center of the wheel shaft joint 330 of the steering knuckle 300.

Thus, when the center of the ball 310b is shifted in the forward direction of the body, the ball stud 310a integrally connected to the ball 310b is also shifted in the forward direction of the body.

At this time, displacement of the insertion hole, into which the ball stud 310a is inserted, is also required.

Thus, the connector for manual steering can be exchanged with the connector for power steering in which the insertion hole is drilled in the forward direction of the body centering the position where the connector is fastened to the lower arm 400.

That is to say, by substitution of the connector alone, the lower arm 400 is used in common.

In this manner, by eccentrically disposing the mounting bolts 111, 112 and 113 of the insulator 110 relative to the center of the strut 100, by rotating the insulator 110 at an angle of 120° in the counterclockwise direction to change the caster value and by exchanging the connector for manual steering with the connector for power steering, the strut 100 and the lower arm 400 can be used in common in the manual and power steering systems without a change in the center point of the wheel shaft connected to the steering knuckle 300 in the same kind of vehicles.

In the meantime, the insertion hole 411 of the connector 410, as shown in FIG. 5, may be eccentrically drilled relative to the center of the connector 410.

Here, in the case that the connector 400 is reversely used when the manual steering system is changed into the power steering system and when the center position of the ball 310b of the ball joint assembly 310 is displaced in the forward direction of the body, the position of the insertion hole 411 moves in the forward direction of the body according to an eccentric characteristic, so that the ball stud 310a moving in the forward direction of the body can be received.

In this manner, because the connector 410 has only to be reversely used without drawing a sharp line between the connector for manual steering and the connector for power steering when the manual steering system or the power steering system is changed, the lower arm 400 and the connector 400 can be used in common, and thus it is possible to reduce unnecessary production costs and to save the unit price of production.

Moreover, as mentioned above, by moving the center position of the strut 100 in the rearward direction of the body and by moving the position of the ball stud 310a of the ball joint assembly 310 in the forward direction of the body, a geometry of the mounting portion 430 formed the other terminal end of the lower arm 400 can be changed.

Where it is necessary to cope with the change of this geometry, the bracket 510 of the frame 500 is shared by two applications, and thus used as a bracket for power steering in which the fastening hole 511 corresponding to the changed height is drilled.

That is, as shown in FIG. 6, in the case of the manual steering system, a bracket for manual steering in which the lower fastening hole (indicated by a dashed line) is drilled is used. In the case of the power steering system, a bracket for manual steering in which the upper fastening hole (indicated by a solid line) is drilled is used.

In this manner, by connecting the lower arm 400 and the frame 500 using the bracket for power steering capable of covering the changed geometry of the lower arm 400, substitution of the bracket 510 alone in the existing frame 500 allows the existing frame 500 to be used in common.

In the meantime, in the case that the geometry of the lower arm 400 is greatly changed, as shown in FIG. 7, a bracket 510a, which is capable of covering the changed geometry of the lower arm 400 and is provided with at least two fastening holes 511a and 511b, may be used.

More specifically, in the case of the manual steering system, the lower arm 400 is mounted using the lower fastening hole 511b. In the case of the power steering system, the lower arm 400 is mounted using the upper fastening hole 511a.

Thus, it is possible not only to use the bracket 510a and the frame 500 in common, but also to cover the changed geometry of the lower arm 400, so that capabilities for producing and assembling are enhanced.

In this manner, by commonly using the strut 100, the lower arm 400 and the frame 500 when the manual steer system and the power steering system are exchanged with each other, by eccentrically disposing the three mounting bolts 111, 112 and 113 of the insulator 110 relative to the center of the strut 100, by eccentrically drilling the insertion hole 411 of the connector 410, and by sharing the bracket 510 of the frame 500, it is possible to use the same components of the suspension, but to change mounting positions of the same components of the suspension, so that it is possible to perform all functions of two systems.

Thus, components of the suspension can be commonly used in both manual steering system and power steering system. As a result, overlapping investment is prevented, thus investment costs are saved.

Even though the foregoing is made regarding change of the manual steering system into the power steering system, this may be naturally applied to change of the power steering system into the manual steering system.

Although a preferred embodiment of the present invention has been described for illustrative purposes, those skilled in the art will appreciate that various modifications, additions and substitutions are possible, without departing from the scope and spirit of the invention as disclosed in the accompanying claims.

According to the suspension assembly applicable to both the manual and power steering systems of the present invention as mentioned above, there are various effects as follows:

First, the mounting bolts of the insulator is eccentrically disposed relative to the center of the strut, and the connector for manual steering can be exchanged with one for power steering, and vice versa, so that it is possible to commonly use the strut and the lower arm in the manual and power steering systems without changing the position of the center point of the wheel shaft connected to the steering knuckle in the same kind of vehicles.

Second, the insertion hole of the connector is eccentrically drilled relative to the center of the connector, so that the connector can be used in common without drawing a sharp line between one for the manual steering and one for power steering. Thus, it is possible to commonly use the lower arm and the connector. Thereby, it is possible to reduce unnecessary production costs caused by application of another connector and to save the unit price of production.

Third, the bracket is shared by two applications for manual steering and power steering, and the bracket in which the fastening hole compatible with the changed geometry of the lower arm is drilled is used, so that substitution of the bracket in the existing frame allows the existing frame to be commonly used for both the brackets for manual steering and power steering.

Fourth, the bracket is provided with a plurality of fastening holes capable of covering the changed geometry of the lower arm, so that, even when the lower arm is greatly changed, it is possible to commonly use the bracket and the frame and to cover the changed geometry of the lower arm. Thereby, capabilities for producing and assembling are enhanced.

Fifth, the strut, the lower arm and the frame are commonly used when the manual steer system and the power steering system are exchanged with each other, and the three mounting bolts of the insulator are eccentrically disposed relative to the center of the strut, and the insertion hole of the connector is eccentrically drilled, and the bracket of the frame is shared by two applications for manual steering and power steering, so that it is possible to use the same components of the suspension, but to change mounting positions of the same components of the suspension. Thereby, it is possible to perform all functions of two systems.

Therefore, components of the suspension can be commonly used in both manual steering system and power steering system. As a result, overlapping investment is prevented, thus investment costs are saved.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A suspension assembly for manual and power steering systems, comprising:
    a strut having a coil spring and a shock absorber integrally coupled to the coil spring, for supporting a vehicle body;
    an insulator for mounting an upper end of the strut to the vehicle body;
    a steering knuckle connected to a lower end of the strut;
    a ball joint assembly formed at the steering knuckle;
    a connector having an insertion hole therein and configured for insertion of a ball stud of the ball joint assembly; and
    a lower arm mounted with the connector,
    wherein the insulator has a mounting bolt eccentrically disposed relative to the center of the strut, and
    wherein the connector is exchangeable with another connector having the insertion hole drilled at a different position.

2. The suspension assembly as set forth in claim 1, wherein the insertion hole of the connector is eccentric about a position where the connector is fastened.

3. The suspension assembly as set forth in claim 2, wherein the lower arm is mounted to a frame by a bracket, and wherein the bracket includes a fastening hole therein to accommodate an angle of the lower arm created by a manual or power steering system.

4. The suspension assembly as set forth in claim 3, wherein the fastening hole is drilled.

5. The suspension assembly as set forth in claim 2, wherein the lower arm is mounted to a frame by a bracket, and wherein the bracket has a plurality of fastening holes therein to support the lower arm at a plurality of angles.

6. The suspension assembly as set forth in claim 5, wherein the fastening holes are drilled.

7. The suspension assembly as set forth in claim 2, wherein the insertion hole is drilled.

8. The suspension assembly as set forth in claim 1, wherein the lower arm is mounted to a frame by a bracket, and wherein the bracket includes a fastening hole therein to accommodate an angle of the lower arm created by a manual or power steering system.

9. The suspension assembly as set forth in claim 8, wherein the fastening hole is drilled.

10. The suspension assembly as set forth in claim 1, wherein the lower arm is mounted to a frame by a bracket, and wherein the bracket has a plurality of fastening holes therein to support the lower arm at a plurality of angles.

11. The suspension assembly as set forth in claim 10, wherein the fastening holes are drilled.

12. The suspension assembly as set forth in claim 1, wherein the insertion hole is drilled.

* * * * *